2 Sheets--Sheet 1.

B. FIELD & G. M. PULLMAN.

Sleeping-Car.

No. 6,648. Reissued Sept. 21, 1875.

*Witnesses:*

M. Yardrill,

Edw. W. Down

*Inventors:*

George M. Pullman &
Benj. Field
per Saml A. Duncan atty.

B. FIELD & G. M. PULLMAN. 2 Sheets--Sheet 2.

Sleeping-Car.

No. 6,648.

Reissued Sept. 21, 1875.

Witnesses:
M. Gardner,
Edw. W. Down

Inventors:
George M. Pullman &
Benj. Field.
per Saml A. Duncan, atty.

UNITED STATES PATENT OFFICE.

BEN FIELD, OF ALBION, NEW YORK, AND GEORGE M. PULLMAN, OF CHICAGO, ILLINOIS, ASSIGNORS, BY MESNE ASSIGNMENTS, TO GEORGE M. PULLMAN.

IMPROVEMENT IN SLEEPING-CARS.

Specification forming part of Letters Patent No. 49,992, dated September 19, 1865; reissue No. 2,862, dated February 11, 1868; reissue No. 3,254, dated January 5, 1869; reissue No. 6,648, dated September 21, 1875; application filed July 27, 1875.

*To all whom it may concern:*

Be it known that BEN FIELD, formerly of Albion, in the county of Orleans and State of New York, and GEORGE M. PULLMAN, of Chicago, in the county of Cook and State of Illinois, did invent certain new and useful Improvements in Sleeping-Cars for Railways, for which Letters Patent were granted September 19, 1865, and reissued February 11, 1868, and again reissued January 5, 1869, which said invention, with the Letters Patent intended to secure the same, have, by assignments dated September 23, 1867, and October 24, 1868, now become the exclusive property of me, the said GEORGE M. PULLMAN, as assignee of the said FIELD and PULLMAN; and I do hereby declare that the following is a full, clear, and exact description of the same, reference being had to the annexed drawings, making part of this specification, in which—

Figure 1:
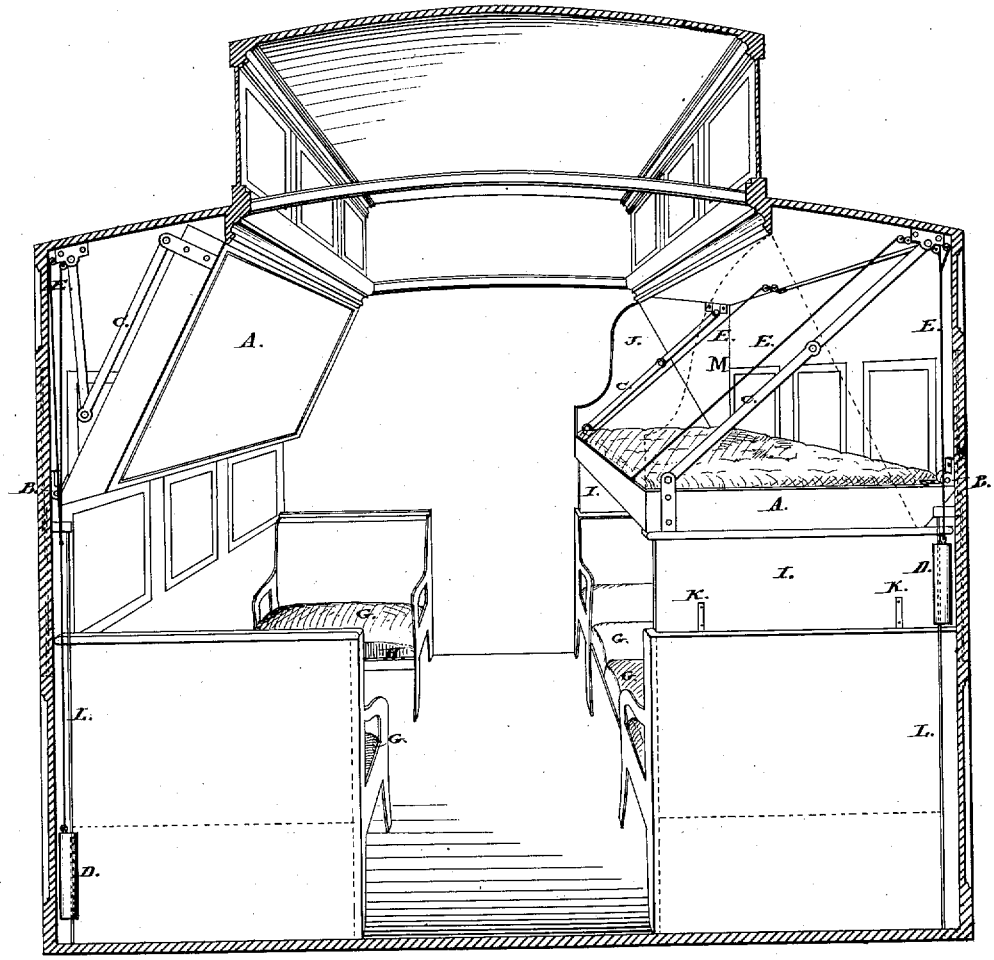
Figure 2:
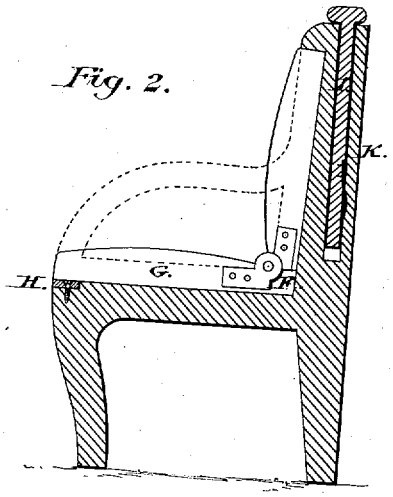
Figure 3:
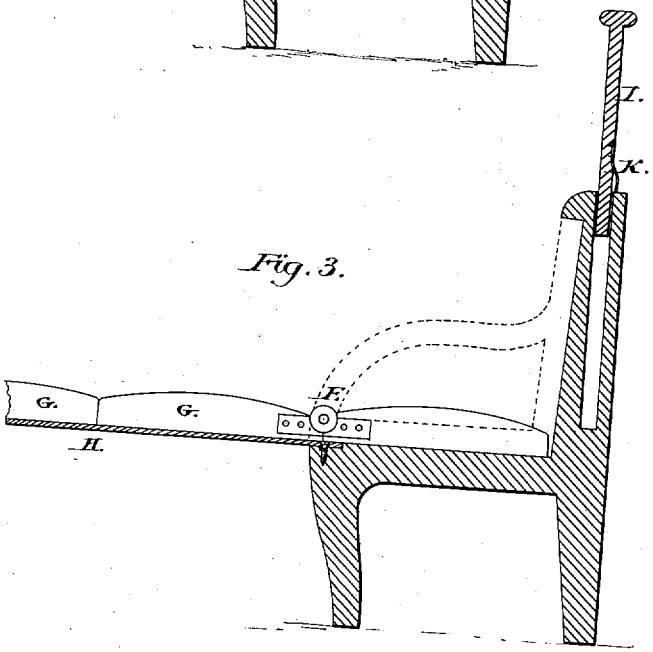

Figure 1 is a perspective view of the interior of a portion of a sleeping-car, representing one set of berths on each side of the car, one side being shown as arranged for day use, and the other for night use. Fig. 2 is a cross-section of one of the seats of the car as adjusted for day use. Fig. 3 is a cross-section of one of the seats, as adjusted for forming a sleeping-couch.

The invention relates to the mode of arranging and supporting the upper berths of a sleeping-car; to the mode of forming the partitions between the sections, so that they may be put up and taken down with facility, thus dividing the car into private compartments at night, and yet leaving the space above the seats open for the circulation of air in the daytime; and to the construction and arrangement of the seats with view to their ready conversion into couches, and vice versa.

In carrying out the invention, the car on each side of the central passage-way is divided up into sections. Each of these sections is provided with two berths or couches—an upper one attached longitudinally by its outer side to the wall of the car, and a lower one formed out of the seat backs and bottoms. The outer side of the upper berth is connected with the wall or side of the car in such manner that the berth may be thrown up from the horizontal position which it occupies at night into an inclined or vertical position, in order to get it out of the way of the heads of the passengers by day, its line of connection with the wall of the car constituting the axis of motion upon which it turns as it is moved from the horizontal to the upright position.

The frame of this upper berth incloses the mattress and bedding. It is shown in the drawing as consisting of a box or tray with sides, ends, and bottom, capable of containing a mattress wholly inclosed within it, and this box or tray is attached to the side of the car by its upper edge. By thus locating the hinges, the berth is made to occupy a lower position when horizontal than if the hinges were at the lower edge of that same side of the box, and, consequently, the berth is so connected with the wall of the car as to be more out of the way when turned up, thus leaving more vertical space below it for the windows. Furthermore, the vacant space which would otherwise exist between the side of the box and the wall of the car is avoided. The back of the box should be made inclined or shelving, as shown in the drawing, so as to furnish still more room underneath when the berth is in its upright or day position.

For supporting the berth in its horizontal position, suspending devices are used, the weight of the berth, other than what is sustained directly by the wall of the car, or incidentally by the counter-weights hereinafter mentioned, being borne by these suspending devices which are attached to the car at points above the horizontal plane of the berth.

By thus supporting the berth, through the medium of suspending devices sustaining it from above, these devices can be so constructed as to be moved out of the way when the berth is turned up. In this respect the construction differs materially from that in which the berth is supported from below by cleats or bolts attached to or entering permanent partitions arranged between the sections.

The preferred form of suspending devices is that shown in the drawing—viz, two jointed metallic straps pivoted to the berth, one at each end near its inner front corner, the upper ends of the straps being pivoted near the upper corner of the car. The joint in these suspenders enables them to fold together behind the berth and out of the way and out of sight when the berth is turned up.

By the employment of counter-balances the handling of the berth is facilitated, the berth, when counterbalanced, being more easily raised to its day position, and lowered to its position at night with less shock and strain.

Counter-balances are also useful to prevent the berth from falling down if the spring-catch relied upon to hold it up in its day position breaks or becomes disengaged.

In the drawing the berth is shown as counterbalanced by weights which, in order to steady them, are made to move up and down on vertical rods, and which are connected with the front part of the berth by means of cords working over properly-located pulleys. These weights upon either side of the car may be inclosed in a closet in the center of the car, with wire-rope or other cords leading over suitable pulleys to each berth.

In applying the invention the parts may be so constructed that in turning the upper berths up upon their hinges to get them out of the way of the heads of the passengers they may be raised up into a vertical position, directly against the wall of the car, or they may be so made as to occupy an inclined position when turned up, as shown in the drawing.

Parting-strips, stationary, and of such size and shape as may be required by the degree of inclination to be given to the berths, project inward from the upper part of the wall of the car, which, with the roof and sides of the car, form recesses into which the berths shut. These parting-strips, which thus aid in forming the recesses that receive the upturned berths, do not extend far enough into the car to interfere with the free circulation of the air through the car by day, as would necessarily be the case with permanent partitions extending from the roof of the car down to the seats.

The difference between these recesses thus formed against the side of the car, at the upper part thereof, and recesses formed wholly in the roof of the car is that with the latter the berth must be raised up bodily in changing it from its night to its day position, the entire weight of the berth being lifted up several feet into the roof, while with the former the berth may be simply turned up into its recess, moving upon a fixed axis of motion, and occupying at last substantially an upright rather than a horizontal position.

Portions of the bed-clothing, according to the size of the space inclosed by each upturned berth, may be stowed away in the daytime in the recess behind such berth. The front side of the berth shuts tightly against the roof of the car, thus forming with the recess a close closet, in which the bedding placed therein will be protected from dust and cinders, and wholly concealed from observation. The backs of the seat-frames are provided with movable parts or sections, capable of being raised and lowered at will, and extending substantially from the aisle to the wall of the car. These movable sections, when placed in position for night use, constitute an upward extension of the short backs of the seat-frames, and complete the partitions between the adjoining lower couches. The drawing represents these movable sections as consisting of sliding panels moving vertically up and down in ways or recesses formed in the seat-backs. When drawn up they extend to the bottom of the upper berths, and are held in place by suitable spring-catches. A single movable partition between each two adjoining upper berths, the same serving as a head-board to the one berth, and a foot-board to the other, is used in dividing the upper part of the car into compartments at night, such partition being separate from, and therefore adjustable independently of, the berths. By using for this purpose a movable piece that can be taken out of the way in the daytime the upper part of the car is left unobstructed when arranged for day use, and by employing for this purpose a partition in one piece and detached from the berths, there result greater convenience and simplicity of construction than exists in those structures in which the partition is composed of more pieces than one, each separately adjustable, or those in which the partitions are permanently attached to the berths, so as to be taken down and set up with them. This movable partition between the upper berths is shown in the drawing as a piece which is slipped in from the aisle as the berths are made up, and it rests upon the top of the vertically-sliding panel that completes the partition between the corresponding lower couches. The seats are arranged transversely and in pairs, facing each other, as shown, and at a sufficient distance apart to give length for a berth between the backs of the frames when the back cushions have been removed.

The back-cushion and the seat-cushion of each chair are made separate from the bottom and the back of the seat-frame, and are hinged together at the two edges where they meet. When the lower couch has to be made up for sleeping, the two seat-cushions of the section are drawn forward until they meet, the back-cushions being at the same time drawn away from their upright supports and falling down into a horizontal position upon the seat-frames. The inner ends of the seat-cushions when thus drawn out are supported by a bar, which turns on a hinge from one of the seats, and bridges over the space between the two seats of the section, while the outer ends of these cushions rest upon a cleat or ledge upon the side of the car.

By making the seat and back cushions detached from the frames upon and against which they rest, as described, and hinging them together at the edges where they meet, considerable facility of manipulation is gained, as compared with those constructions in which the seat-cushions are permanently attached to the frame below it, or in which the seat-cushion and the back-cushion are either entirely disconnected or are connected by a link pivoted to each rather than by a simple hinge.

Referring to the drawing, the different parts hereinbefore spoken of are represented by letters, as follows: A is an upper berth; B, one of the hinges, by which it is connected with the wall of the car; C C, the jointed metallic suspenders for supporting the front part of the berth; D D, weights for counterbalancing the berth, running on the rods L to steady them, and connected with the berth by cords E E. F F are the hinges, by which the seat-cushions G are connected with the back-cushions. H is the pivoted bar, upon which the inner ends of the seat-cushions rest when drawn forward in making up the sleeping-couch. I is the movable piece, (here shown as a vertically-sliding panel supported in its elevated position by the spring-catches K,) which, together with the back of the seat-frame, constitutes the partition between the lower couches. J is the movable head-board between the upper berths, and M are the parting-strips, which, in connection with the wall and the roof, form the recess, which receives the berth when turned up.

What is claimed as new is—

1. In combination with the upper berth, one side of which is connected with the wall of the car, suspending devices for supporting the front part of such berth, and capable of being moved out of the way in the day-time, the parts being constructed so that the berth may be turned up from a horizontal to substantially an upright position, and the suspending devices moved out of the way and concealed, and vice versa, substantially as described.

2. In combination with an upper berth, the back side of which is connected with the wall of the car, a counter-balance connected with the front part of such berth, to facilitate the handling of the same and aid in sustaining it when raised, substantially as set forth.

3. In combination with the upper berth, a recess formed against the side of the car, the parts being so constructed that the berth may occupy a horizontal position at night, and be turned up into such recess by day, substantially as described.

4. In combination with the stationary back of the seat-frame, a movable piece, which, when placed in position for night use, extends substantially from the aisle to the wall of the car, and operates to complete the partition between the adjoining lower berths, substantially as set forth.

5. In combination with two adjoining upper berths, but separate therefrom, a movable partition in one piece, which, when placed in position for night use, serves as the head-board of the one berth and the foot-board of the other, and which can be moved away from between the sections, so as to leave the upper part of the car clear by day, substantially as described.

6. A box or tray adapted to contain a mattress, and connected with the wall of the car at the upper edge of one of its sides, substantially as set forth, whereby it can be made to occupy a lower position at night and leave more room under it by day than if otherwise constructed and supported.

7. An upper berth, having its outer or wall side made inclined or sloping, substantially as and for the purpose set forth.

8. The construction and arrangement of a car-seat, with the back and seat cushions hinged together and disconnected from the seat-frame, so that the back-cushion may be placed horizontally on the seat-frame, and the seat-cushion extended to meet the seat-cushion of the opposite seat, substantially as described.

GEO. M. PULLMAN.

Witnesses:
S. W. BRETZFIELD,
HORACE PORTER.